United States Patent
Pflug

[19]

[11] Patent Number: 5,997,008

[45] Date of Patent: Dec. 7, 1999

[54] SEALING RING

[75] Inventor: Herwig Pflug, Waldems, Germany

[73] Assignee: Klinger AG, Zug, Switzerland

[21] Appl. No.: 08/868,593

[22] Filed: Jun. 4, 1997

[30] Foreign Application Priority Data

Jun. 4, 1996 [DE] Germany .............................. 196 22 384

[51] Int. Cl.$^6$ ...................................................... F16J 15/12
[52] U.S. Cl. ........................... 277/627; 277/608; 277/612; 277/626
[58] Field of Search ............................. 285/910; 277/608, 277/609, 615, 626, 612, 652, 627, 644, 648, 649, 650; 411/369, 542, 544, 545

[56] References Cited

U.S. PATENT DOCUMENTS

| | | | |
|---|---|---|---|
| 843,394 | 2/1907 | Haynes | 277/612 X |
| 3,333,813 | 8/1967 | Rabe | 277/626 X |
| 3,537,733 | 11/1970 | Martin | 277/626 X |
| 3,595,588 | 7/1971 | Rode | 277/650 |
| 4,145,509 | 3/1979 | Bhatia | 277/650 |
| 4,375,290 | 3/1983 | Zucchi et al. | 277/608 |
| 4,819,973 | 4/1989 | Pegon . | |
| 4,877,272 | 10/1989 | Chevallier et al. | 277/626 X |
| 4,878,678 | 11/1989 | Hensley et al. | 277/650 |
| 5,423,580 | 6/1995 | Mohlenkamp et al. . | |
| 5,486,010 | 1/1996 | Hamilton et al. | 277/652 X |
| 5,706,787 | 1/1998 | Fujikawa | 277/591 X |

FOREIGN PATENT DOCUMENTS 0 384 741  8/1990  European Pat. Off. .

OTHER PUBLICATIONS

European Search Report for EP 97 10 8854, dated Sep. 17, 1997.
Patent Abstract of Japanese Patent 61192971.
Patent Abstract of Japanese Patent 03119089.

*Primary Examiner*—Anthony Knight
*Attorney, Agent, or Firm*—Alix, Yale & Ristas, LLP

[57] ABSTRACT

A sealing ring, for use in establishing a fluid-tight connection between the facing ends of tubular members which are to be braced axially with respect to one another, comprises a thin sheet-metal ring provided with a corrugation which defines an effective sealing ring thickness greatly in excess of the thickness of the sheet-metal. The sealing ring is provided with a non-metallic coating on both sides, the coating on at least one side being a layer which functions to achieve microsealing.

20 Claims, 2 Drawing Sheets

EFFECTIVE THICKNESS

SEALING RING

BACKGROUND OF THE INVENTION (1) Field of the Invention

The present invention relates to the establishment of fluid-tight couplings between parts and, particularly, to sealing the joints between facing adjacent ends of conduits or the like. More specifically, this invention is directed to sealing rings and, especially, to compressible metal ring seals for use between parts which are to be braced axially with respect to one another. Accordingly, the general objects of the present invention are to provide novel and improved methods and articles of such character.

(2) Description of the Prior Art

Sealing rings for preventing leakage between facing surfaces which lie opposite to one another, and are axially braced with respect to one another, are well known in the art. Such sealing rings are, for example, widely used between lengths of pipe or the like which are to be joined in series by threaded coupling members, the coupling precluding relative axial movement between adjacent pipes. The characteristics of such sealing rings, i.e., the inner diameter, external diameter, thickness and material, for respective applications are typically found in published specifications such as, for example, DIN standards.

A long standing problem in the art is precipitated by the fact that sealing rings designed for the type of usage briefly described above are customarily relatively thick, the thickness being dictated by the desire to minimize the possibility of the rings becoming off-center as a consequence of slipping into threads or recesses in the coupling mechanism. Any such slippage, of course, will result in a portion of the ring extending into the passage carrying the fluid medium, thereby restricting flow and/or causing unacceptable turbulence. The seal ring thickness previously deemed necessary, however, usually leads to an unfavorable, and therefore undesirable, ratio of the compressed width of the ring to its thickness. This is particularly critical in the case of pipes or similar parts which are to be rotated, i.e., tilted axially, with respect to one another since, in such environments, the annular surfaces to be sealed do not reach a final position in which they are precisely parallel to one another or entirely in registration with one another. The sealing ring, accordingly, has to compensate for such lack of parallelism or registration throughout its entire service life.

SUMMARY OF THE INVENTION

The present invention comprises a novel and improved sealing ring particularly well-suited for imposition between parts which are to be braced axially with respect to one another by means of a threaded coupling. The material comprising the sealing ring of the present invention is thin but the ring itself is formed so as to have sufficient effective thickness whereby it is rendered self-centering. The sealing ring of the present invention is also characterized by the ability to accommodate relative rotation between the parts contacted by the seal while the sealing ring is in a stressed state.

A sealing ring in accordance with the invention comprises a thin sheet-metal ring which defines a predetermined effective thickness in the axial direction by means of being provided with a corrugation. The sealing ring of the invention is additionally provided, on one or both sides, with a thin microsealing coating. The sealing ring of the invention may additionally be provided on one side with a coating of a material having a low coefficient friction.

The above-briefly described novel sealing ring is formed from planar sheet material having a thickness, for example, lying in the range of 0.1 mm to 1 mm. This thin metal ring is deformed to include a corrugation whereby the ring will have an adequate effective thickness so that the ring is both self-centering and characterized by a favorable ratio of the pressed width of the ring to its actual thickness. The provision of a microsealing coating, preferably an elastomer coating, or one or both sides of the ring ensures microsealing between the ring and the surfaces of the parts to be coupled. The provision of a low friction, i.e., a slip, coating on at least one side of the ring makes it possible to rotate the parts to be coupled with respect to one another or to use the sealing ring of the invention between parts which are to be relative rotated during establishment of the sealed relationship. The use of a slip coating also permits the sealing ring of the invention to be used when the parts to be fluidically coupled are to be aligned subsequent to preliminary loading of the sealing ring.

A particularly important attribute of a corrugated sheet-metal sealing ring in accordance with the invention is that the ring can be re-deformed virtually without creases. This advantage results from the fact that, as a consequence of the presence of the corrugation, the ring undergoes only slight plastic deformation during an installation procedure.

BRIEF DESCRIPTION OF THE DRAWING

The present invention may be better understood, and its numerous objects and advantages will become apparent to those skilled in the art, by reference to the accompanying drawing wherein like reference numerals refer to like elements in the several Figures and in which.

DESCRIPTION OF THE DISCLOSED EMBODIMENT

Figure 1:
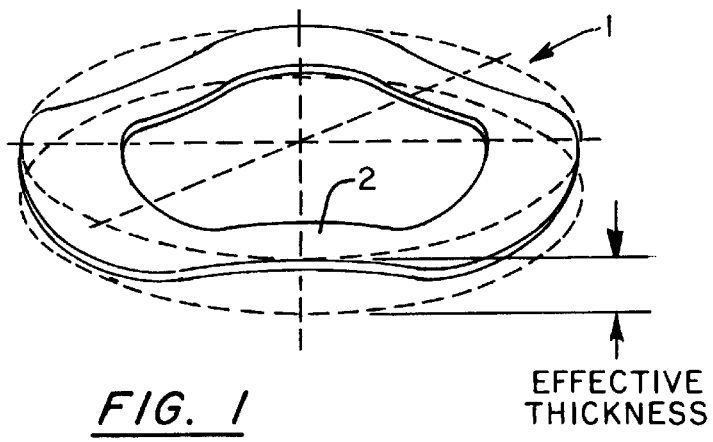
FIG. 1 is a perspective view of a first embodiment of a sealing ring in accordance with the present invention.
Figure 2:
FIG. 2 is a side elevation view of the sealing ring of FIG. 1.

With reference first to FIGS. 1 and 2, a sealing ring in accordance with a first embodiment of the invention is indicated generally at 1. Sealing ring 1 is provided with a corrugation 2 which extends in the circumferential direction. Corrugation 2 defines two pair of mutually opposite crests and troughs. The effective thickness of sealing ring 1, as clearly indicated in both of FIGS. 1 and 2, is considerably greater than the thickness of the sheet metal from which the ring 1 is formed. This effective thickness of ring 1 is thus set to a predetermined value by means of the corrugation.

The sealing ring 1 is provided on at least one side with an elastomer coating which is employed for purposes of microsealing. This elastomer coating is not shown on FIGS. 1 and 2 but is indicated at 12 in FIGS. 3 and 4. The elastomer coating(s) will compensate for roughness in the surface(s) of the parts which are to be fluidically coupled through use of ring 1 and/or to compensate for other operating conditions which may be encountered. The thickness of elastomer coating 12 will typically be within the range of 5 to 400 μm.

Sealing ring 1 is, for example, comprised of ferritic or austenitic steel, specifically unhardened or spring steel. The ring 1 is formed by punching from strip material, typically with simultaneous shaping, the strip material being optionally (and preferably) coated on both sides with the above-described elastomer. As indicated in FIG. 4, a coating 14 of a low-friction material may be provided on one side of ring 1 and coating 14 may be applied over a layer of the elastomer microsealing coating 12.

Figure 3:
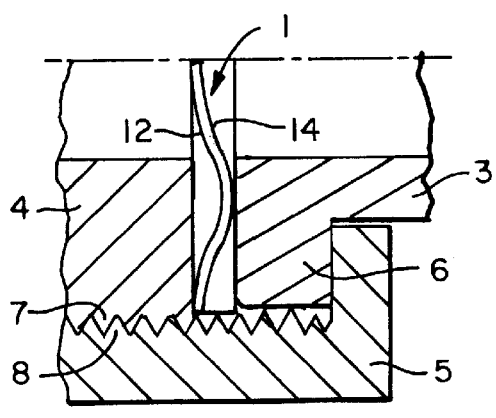
FIG. 3 is a partial cross-sectional view which schematically illustrates a use of the sealing ring of FIGS. 1 and 2.

FIG. 3 depicts the sealing ring of FIG. 1 in the use environment where it establishes a fluid tight seal between the facing ends of a pair of generally axially aligned tubular members 3 and 4. Members 3 and 4 are mechanically joined, i.e., braced together, by means of a union nut 5. Nut 5 is internally threaded and includes a radially inwardly extending flange which engages a complementary flange 6 provided about the end of tubular member 3. The internal thread 8 on nut 5 engages an external thread 7 provided on tubular member 4. In the FIG. 3 coupling arrangement, the internal thread 8 extends over the entire length of the internal bore of nut 5. Due to its relatively large effective thickness, ring 1 cannot slip into the thread of nut 5, and thus become off-centered, during the tightening of the nut to establish a seal between the facing ends of tubular members 3 and 4. To the contrary, as a result of the provision of corrugation 2, sealing ring 1 and thereby its sealing faces are actually self centering between the internal threads 8 of nut 5. As nut 5 is tightened, ring 1 is pressed flat and thus bears against the sealing surfaces, i.e., the facing ends of tubular members 3 and 4. The integrity of the fluid tight seal created by ring 1 is enhanced by the provision of the elastomer layers 12 on the opposite sides thereof which function as microsealing coatings. In the process of the tightening of union nut 5, ring 1 adjusts itself to the opposed sealing surfaces even if the latter do not completely cover one another, i.e., are not precisely in registration, or are not parallel to one another. It is also to be noted that ring 1 has a predetermined restoring elasticity and thus the joint between tubular members 3 and 4 may be broken and reestablished.

As noted above, it may in some cases be desirable that the ring 1 be provided on at least one side with a coating of a material having a low coefficient of friction, i.e., a "slip layer" 14. Such a slip layer may, for example, be comprised of PTFE, talc, graphite, mica, $MoS_2$ or the like. The slip layer, when employed, permits the components between which ring 1 is sandwiched to be repositioned, to be aligned for example, by being rotated with respect to one another subsequent to the establishment of some initial stress in the sealing ring.

Figure 4:
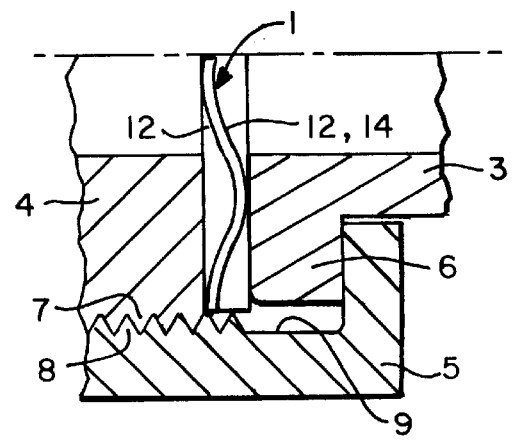
FIG. 4 is a view similar to FIG. 3 depicting another use environment of a sealing ring in accordance with the invention.

Referring to FIG. 4, a second use environment of a sealing ring in accordance with the invention is depicted. The use environment depicted in FIG. 4 differs from that of FIG. 3 in that the internal thread 8 of the union nut does not extend the entire length of the internal bore of the nut. When employing a prior art sealing ring in the environment depicted in FIG. 4, there would be an inherent danger that the ring would move into the gap between the inner diameter of nut 5 and the outer diameter of the flange 6 on tubular component 3 during tightening of the nut. Such movement would cause the sealing ring to become off-centered and thus project into the flow passage. Because of the relatively large effective thickness of the sealing ring of the present invention, which results in the above-described self-centering action, the present invention eliminates this potential problem. In FIG. 4, sealing ring 1 is depicted with a microsealing coating 12 on one surface and a coating which comprises either or both of a slip coating and microsealing coating on the opposite surface.

Figure 5:
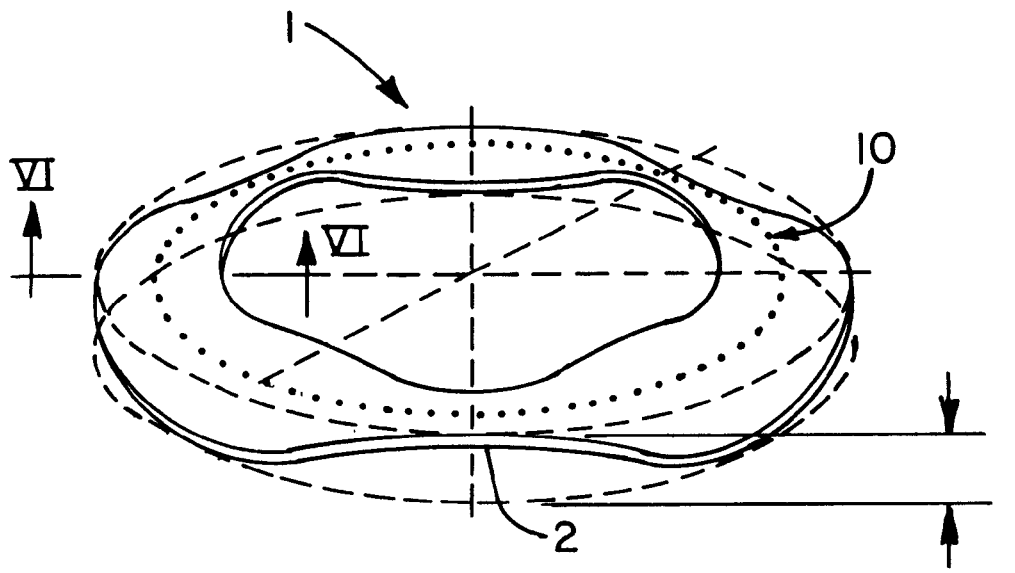
FIG. 5 is perspective view of a second embodiment of a sealing ring in accordance with the invention.
Figure 6:
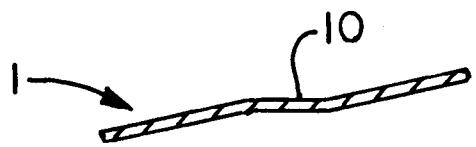
FIG. 6 is a partial, cross-sectional view, taken along line VI—VI of FIG. 5, of the sealing ring of FIG. 5.

In the embodiment of the sealing ring shown in FIGS. 5 and 6, a variation in inclination in the radial direction is superimposed on the corrugation which extends in the circumferential direction. Accordingly, in a central portion of the ring, a narrow encircling annular region 10 will be created. In this annular region 10, the thin metal comprising the sealing ring will remain in the plane of the sheet-metal blank (or of the metal sheet from which the latter is stamped) while the inclination of the ring changes in its direction with respect to the radial plane of the ring. Accordingly, if there is a crest of the corrugation 2 on the outer circumference, there will be a trough of the corrugation on the inner circumference, and vice versa. The corrugation 2 may also define more than two pairs of crests and troughs, and the corrugation too may also be different in the regions adjacent the inner and outer circumferences of ring 1. Alternatively, a corrugation may be provided only on an outer or inner circumferential region of the ring. The corrugation 2 may also represent an axial deformation which fluctuates about a fixed point on the axis 16 of the sealing ring. Corrugations extending along the inner and outer edges of ring 1 may be delimited towards the center of the sealing ring by means of circumferentially spaced notches which extend in the circumferential direction.

Figure 7:
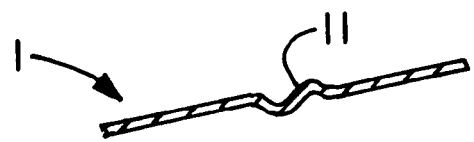
FIGS. 7 and 8 are views similar to FIG. 6 which depict further variants of the embodiment of FIG. 5.
Figure 8:
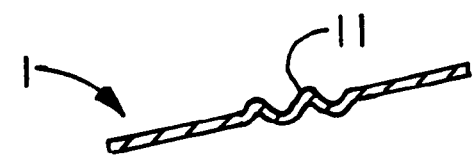

Modifications of the embodiment of FIG. 5 are depicted in FIGS. 7 and 8, FIGS. 7 and 8 being partial cross-sectional views similar to FIG. 6. In these modifications, the ring is stamped or otherwise shaped to form an encircling bead 11 in the annular region 10. The bead 11 may occupy the entire width of annular region 10. The bead 11 may be useful to compensate for angular deviations in the sealing surfaces of the parts being joined such as the tubular members 3 and 4 of FIGS. 3 and 4. It will be obvious to those skilled in the art that deformations in the annular region 10 other than those shown in FIGS. 7 and 8 may be employed to accomplish the same purpose. Alternatively, a bead 11 may be provided in a corrugated annular region, i.e., in a narrow encircling annular region which does not remain in the plane of the sheet-metal blank.

A sealing ring in accordance with the invention can be produced with an effective thickness, i.e., a corrugation, which exceeds that required for the intended use. Subsequently, by re-deformation of this excess to the required effective thickness, the ring may be fixed to one of the components of the joint to be formed. For example, the ring may be fixed to the internal diameter of a union nut, such as the nut 5 depicted in FIGS. 3 and 4, with e.g. a tight fit. The tight fit may be caused by the previously described re-deformation of excess ring corrugation due to clamping or a predefined out-of-roundness. The ring would thus become a permanent part of the nut.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A sealing ring for establishing a fluid impervious connection between facing end surfaces of tubular members which respectively have axes, the tubular members being substantially axially immobilized with respect to one another by means of threads in the sealed condition, said sealing ring comprising a thin sheet-metal ring having a pair of opposed sides, said ring sides having at least inner and outer edge regions which extend about inner and outer diameters of said ring, said ring also having an axis, the effective thickness of said ring in the axial direction exceeding the thickness of the sheet metal comprising the ring such that the ring is supported by the thread of one of the tubular members so that the axis of the ring is aligned with the axes of said tubular members, said effective thickness being defined by a corrugation, said opposite sides of said ring being sealing surfaces and each of said sides being provided with a non-metallic coating, the coating on one of said sides comprising a microsealing layer and the coating on the other side comprising a material having a low coefficient of friction.

2. The sealing ring of claim 1 wherein said microsealing layer comprises an elastomer having a thickness in the range of about 5 to 400 μm.

3. The sealing ring of claim 2 wherein said corrugation is a circumferential corrugation.

4. The sealing ring of claim 3 wherein said corrugation comprises an axial deformation which fluctuates about a fixed point on said axis of said ring.

5. The sealing ring of claim 3 wherein said corrugation occupies one of said edge regions of said ring.

6. The sealing ring of claim 3 further comprising a radially directed inclination, which changes in a corrugated manner around said ring circumference, superimposed on said circumferential corrugation.

7. The sealing ring of claim 6 further comprising an annular region situated in the plane defined by said sheet-metal comprising said ring prior to the formation of said corrugation, said corrugation being radially displaced to one side of said annular region, and a second corrugation being radially displaced to the other side of said annular region.

8. The sealing ring of claim 3 further comprising an annular region disposed between said inner and outer edge regions, said annular region being shaped to define a compressible bead.

9. The sealing ring of claim 2 wherein said corrugation occupies one of said edge regions of said ring.

10. The sealing ring of claim 2 wherein said microsealing layer is provided on both sides of said ring.

11. The sealing ring of claim 1 wherein said corrugation is a circumferential corrugation.

12. The sealing ring of claim 11 wherein said corrugation comprises an axial deformation which fluctuates about a fixed point on said axis of said ring.

13. The sealing ring of claim 11 wherein said corrugation occupies one of said edge regions of said ring.

14. The sealing ring of claim 11 further comprising a radially directed inclination, which changes in a corrugated manner around said ring circumference, superimposed on said circumferential corrugation.

15. The sealing ring of claim 14 further comprising an annular region situated in the plane defined by said sheet-metal comprising said ring prior to the formation of said corrugation, said corrugation being radially displaced to one side of said annular region, and a second corrugation being radially displaced to the other side of said annular region.

16. The sealing ring of claim 14 further comprising an annular region disposed between said inner and outer edge regions, said annular region being shaped to define a compressible bead.

17. The sealing ring of claim 1 wherein said corrugation occupies one of said edge regions of said ring.

18. The sealing ring of claim 17 further comprising an annular region situated in the plane defined by said sheet-metal comprising said ring prior to the formation of said corrugation, said corrugation being radially displaced to one side of said annular region, and a second corrugation being radially displaced to the other side of said annular region.

19. The sealing ring of claim 1 further comprising an annular region disposed between said inner and outer edge regions, said annular region being shaped to define a compressible bead.

20. The sealing ring of claim 1 wherein both said sides are provided with a microsealing layer and at least one of said sides further comprises said coating of said material having a low coefficient of friction covering said microsealing coating.

* * * * *